(12) United States Patent
Norja et al.

(10) Patent No.: US 11,947,243 B2
(45) Date of Patent: Apr. 2, 2024

(54) AUTO-FOCUS APPARATUS FOR CAMERA

(71) Applicant: Changzhou AAC Raytech Optronics Co., Ltd., Changzhou (CN)

(72) Inventors: Olli Norja, Tampere (FI); Eero Sakari Paivansalo, Tampere (FI)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 126 days.

(21) Appl. No.: 17/702,827

(22) Filed: Mar. 24, 2022

(65) Prior Publication Data

US 2023/0305363 A1  Sep. 28, 2023

(51) Int. Cl.
*G03B 13/36* (2021.01)

(52) U.S. Cl.
CPC .................... *G03B 13/36* (2013.01)

(58) Field of Classification Search
CPC .......................................... G03B 13/36
See application file for complete search history.

(56) References Cited

U.S. PATENT DOCUMENTS

| | | | | |
|---|---|---|---|---|
| 6,652,104 B2 * | 11/2003 | Nishida | ............... | H04N 9/3194 353/69 |
| 6,877,863 B2 * | 4/2005 | Wood | ................... | H04N 9/3185 353/42 |
| 7,070,283 B2 * | 7/2006 | Akutsu | ............... | H04N 9/3194 353/30 |
| 7,182,466 B2 * | 2/2007 | Sunaga | ................... | H04N 5/74 353/69 |
| 7,270,421 B2 * | 9/2007 | Shinozaki | ............ | G03B 21/142 353/121 |
| 7,359,575 B2 * | 4/2008 | Bassi | ..................... | G06T 3/0093 345/427 |
| 7,441,906 B1 * | 10/2008 | Wang | ..................... | G03B 21/14 353/121 |
| 7,782,387 B2 * | 8/2010 | Azuma | ................ | H04N 23/635 359/662 |
| 11,513,324 B2 * | 11/2022 | Paivansalo | ........... | G02B 3/0043 |
| 11,543,654 B2 * | 1/2023 | Paivansalo | ........... | G02B 3/0062 |
| 11,570,334 B2 * | 1/2023 | Ni | ............................ | G03B 3/10 |
| 11,709,347 B2 * | 7/2023 | Brodie | ................... | H04N 23/55 348/208.7 |
| 11,740,486 B2 * | 8/2023 | Ni | ........................ | G02B 27/646 359/557 |
| 2002/0051095 A1 * | 5/2002 | Su | ........................ | H04N 9/3194 348/745 |
| 2002/0122161 A1 * | 9/2002 | Nishida | ................ | H04N 9/3194 353/70 |
| 2003/0191836 A1 * | 10/2003 | Murtha | ................... | H04L 67/02 709/224 |

(Continued)

*Primary Examiner* — Michael B. Pierorazio
(74) *Attorney, Agent, or Firm* — W&G Law Group

(57) ABSTRACT

The invention provides an auto-focus apparatus for a camera. The auto-focus apparatus includes a first lens; a second lens spaced from the first lens; a transparent elastic spacer sandwiched between the first lens and the second lens; and a shape memory alloy wire having a first fixing part connecting with the first lens, a second fixing part connecting with the second lens, and a connecting part connecting the first fixing part to the second fixing part. The shape memory alloy wire can change the distance and deform the transparent elastic spacer between the first and second lenses for performing auto-focus function.

14 Claims, 4 Drawing Sheets

(56) References Cited

U.S. PATENT DOCUMENTS

| | | | | |
|---|---|---|---|---|
| 2003/0210381 A1* | 11/2003 | Itaki | H04N 5/74 | 353/70 |
| 2004/0156024 A1* | 8/2004 | Matsuda | H04N 9/3185 | 353/70 |
| 2005/0046803 A1* | 3/2005 | Akutsu | H04N 9/3194 | 353/69 |
| 2005/0073661 A1* | 4/2005 | Tamura | H04N 9/3194 | 353/70 |
| 2005/0151934 A1* | 7/2005 | Akutsu | G03B 21/147 | 353/69 |
| 2005/0237492 A1* | 10/2005 | Shinozaki | H04N 9/3185 | 353/69 |
| 2006/0098167 A1* | 5/2006 | Sato | G03B 21/26 | 353/35 |
| 2006/0187420 A1* | 8/2006 | Wei | G03B 21/16 | 353/61 |
| 2006/0203207 A1* | 9/2006 | Ikeda | H04N 9/3185 | 353/70 |
| 2007/0008344 A1* | 1/2007 | Medina | H04N 9/3185 | 345/647 |
| 2007/0257941 A1* | 11/2007 | Plut | G06F 9/451 | 345/660 |
| 2007/0285626 A1* | 12/2007 | Miyasaka | G03B 21/206 | 353/85 |
| 2009/0278999 A1* | 11/2009 | Ofune | H04N 21/47 | 348/E3.048 |
| 2010/0002123 A1* | 1/2010 | Nozaki | H04N 23/00 | 348/E5.022 |
| 2010/0045942 A1* | 2/2010 | Furui | H04N 9/3194 | 353/69 |
| 2011/0085044 A1* | 4/2011 | Noda | G03B 21/58 | 348/E5.133 |
| 2011/0210979 A1* | 9/2011 | Furui | H04N 9/3147 | 345/619 |
| 2011/0234994 A1* | 9/2011 | Uchiyama | H04N 9/3185 | 353/121 |
| 2011/0285971 A1* | 11/2011 | Oka | H04N 9/3185 | 353/70 |
| 2011/0292351 A1* | 12/2011 | Ishii | H04N 9/3185 | 353/69 |
| 2013/0162896 A1* | 6/2013 | Kang | G03B 5/00 | 348/E5.026 |
| 2014/0028906 A1* | 1/2014 | Chen | G03B 5/00 | 348/375 |
| 2014/0139695 A1* | 5/2014 | Kawai | G03B 5/00 | 348/208.99 |
| 2015/0241692 A1* | 8/2015 | Lin | G02B 13/16 | 353/31 |
| 2017/0299952 A1* | 10/2017 | Jorgensen | G03B 21/145 | |
| 2018/0095341 A1* | 4/2018 | Lee | G03B 3/10 | |
| 2018/0158102 A1* | 6/2018 | Choi | G06Q 30/0251 | |
| 2019/0230262 A1* | 7/2019 | Wang | G02B 6/0066 | |
| 2020/0073200 A1* | 3/2020 | Eom | G03B 5/00 | |
| 2020/0379239 A1* | 12/2020 | Li | G02B 27/646 | |
| 2021/0289178 A1* | 9/2021 | Ogishita | H04N 9/3194 | |
| 2022/0206362 A1* | 6/2022 | Ni | H04N 23/51 | |
| 2022/0206363 A1* | 6/2022 | Yan | H05K 1/189 | |

* cited by examiner

A-A

AUTO-FOCUS APPARATUS FOR CAMERA

FIELD OF THE PRESENT DISCLOSURE

The present invention relates cameras, and in particular to an auto-focus apparatus for a camera used in a portable electronic device.

DESCRIPTION OF RELATED ART

A camera is a device for capturing images. The electronic camera has been invented that permits the capture of images in electronic form, principally as files that can be read, processed and displayed by other electronic devices.

An electronic camera comprises two principal components, an optical train and an image sensor. The optical train typically contains a plethora of optical active elements including, but not limited to baffles, lenses, apertures, stops, mirrors and the alike. The function of the optical train is to capture light from the scene of interest and focus it on to the image sensor with high fidelity. That is, without too much distortion, aberration, blurring, ghosting or any of the multiplicity of optical artifacts that are known and which serve to degrade the fidelity of the captured image.

The image sensor is an electro-optic component, commonly made of silicon. The operation of such components typically involves dividing the focused image into a large number of microscopic portions and recording the color and illumination intensity of each. The image sensor then processes this information to output a representation of the image in an electronic form. Often these forms are defined by Standards, such as JPEG, permitting them to be readily processed and displayed by other electronic devices.

Electronic cameras come in essentially two flavors including fixed optic and variable optic. In a fixed optic camera, all the elements of the optical train are fixed in functionality and location in the camera at the time of manufacture. This means the performance of the optical train and hence the camera is invariant. Because the primary function of any camera is to capture focused images, cameras of this type are often referred to as 'fixed focus'. Typically, the focus of a fixed focus camera is set at about 1.2 in from the camera. This means that all objects in the range from 60 cm to many tens of meters away have acceptable fidelity in the captured image.

In a variable optic camera, one or more elements of the optical train may be designed to permit variation in function, functionality or location. For example, an aperture placed at the front of an optical train has a major influence on the quantity of light that reaches the image sensor and hence the brightness or darkness of the resulting image. By suitable adjustment of the aperture, one camera can produce images of good fidelity in conditions where the scene is brightly lit, for example in bright sunshine, and where it may be dimly lit, for example in moonlight.

Another example of a variable optic camera is one wherein the position of the entire optical train can be moved along the optical axis of the camera. This alters the focus of the camera permitting objects that are almost any distance from the camera to be captured with high fidelity. If the camera operator selects the focus distance by manual adjustment of the position of the optical train the camera is said to be 'manual focus'. Where an electronic system is used to measure the distance from the camera of the objects in the scene and is used in conjunction with an actuator to move the optical train, the camera is said to be 'auto focus'.

No matter the manual focus or auto focus is used, the key point is to adjust the position of the focal point onto the image sensor. For adjusting the position of the focal point, a camera changes the position of the whole lens system along the optical direction, or changing the focal length of the lens system until the focal point falls on the image sensor. Typical technology to adjust the focal point is to drive the lens system to move along the optical direction by interaction between coils and magnets, which needs complicated mechanical structure and directs to higher cost.

SUMMARY OF THE PRESENT INVENTION

The main purpose of the present invention is to provide an auto-focus apparatus with simplified structure and smaller size.

To achieve the object mentioned above, the present invention provides an auto-focus apparatus including: a first lens; a second lens spaced from the first lens; a transparent elastic spacer sandwiched between the first lens and the second lens; and a shape memory alloy wire having a first fixing part connecting with the first lens, a second fixing part connecting with the second lens, and a connecting part connecting the first fixing part to the second fixing part.

Further, the first lens includes a first lens unit, a first lens plate surrounding and supporting the first lens unit, a plurality of first flanges extending from a periphery of the first lens plate, and a plurality of first vacancies formed between adjacent two first flanges; the first fixing part attaches to the first flanges.

Further, the first fixing part attaches to a surface of the first flange away from the second lens.

Further, the second lens includes a second lens unit, a second lens plate surrounding and supporting the second lens unit, a plurality of second flanges extending from a periphery of the second lens plate, and a plurality of second vacancies formed between adjacent two second flanges; the second fixing part attaches to the second flanges.

Further, the second fixing part attaches to a surface of the second flange away from the first lens.

Further, viewing along an optical axis of the auto-focus apparatus, each of the first flanges at least partially overlaps the second vacancy formed by two adjacent second flanges, and each of the second flanges at least partially overlaps the first vacancy formed by two adjacent first flanges.

The present invention further provides a camera, including: a holder and an auto-focus apparatus accommodated by the holder. The auto-focus apparatus includes a plurality of lenses, a transparent elastic spacer sandwiched by two selected lenses, a shape memory alloy wire having a first fixing part connecting with an edge of one of the selected lenses and a second fixing part connecting with an edge of the other of the selected lenses for changing a distance between the two selected lenses.

In addition, the shape memory alloy wire further includes a connecting part connecting the first fixing part to the second fixing part along the optical axis.

In addition, one of the selected lenses includes a first lens unit and a first lens plate supporting the first lens unit, and the first lens plate includes a plurality of first flanges for attaching with the first fixing part of the shape memory alloy wire.

In addition, the other of the selected lenses includes a second lens unit and a second lens plate supporting the second lens unit, and the second lens plate includes a plurality of second flanges for attaching with the second fixing part of the shape memory alloy wire.

In addition, the first flanges form a plurality of first vacancies, and the second flanges form a plurality of second vacancies malposed with the first vacancies viewing along the optical axis.

From another aspect, the present invention also provides a lens for a camera, including: a first lens unit with a first edge having a first upper surface and a first lower surface opposite to the first upper surface; a second lens unit with a second edge having a second upper surface facing the first lower surface and a second lower surface away from the first lower surface; an elastic spacer sandwiched between the first lower surface of the first lens unit and the second upper surface of the second lens unit; and a shape memory alloy wire determining a distance between the first and second lens units extending from the first upper surface to the second lower surface.

Further, the first edge of the first lens unit forms a plurality of first flanges with the first upper surface, the second edge of the second lens unit forms a plurality of second flanges with the second lower surface; and the shape memory alloy wire extends from the first upper surface to the second lower surface bendingly.

Further, the first flanges are malposed with the second flanges viewing along the optical axis of the lens.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
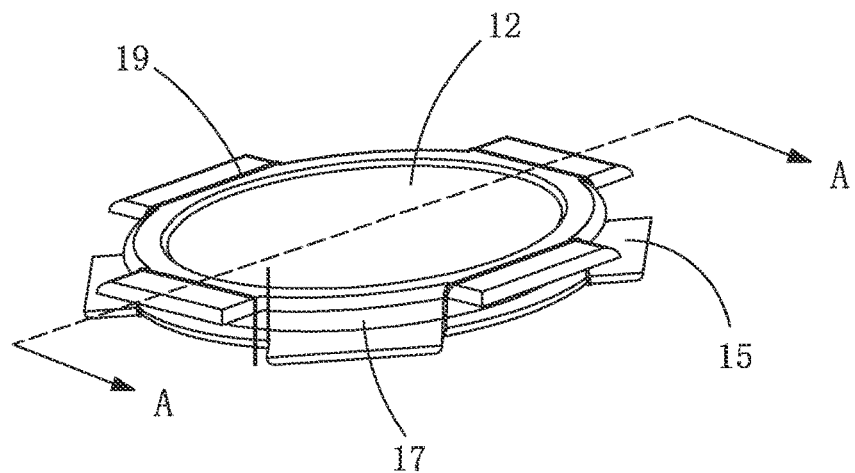
FIG. 1 is an isometric and assembled view of an auto-focus apparatus used in a camera in accordance with a first exemplary embodiment of the present invention.
Figure 2:
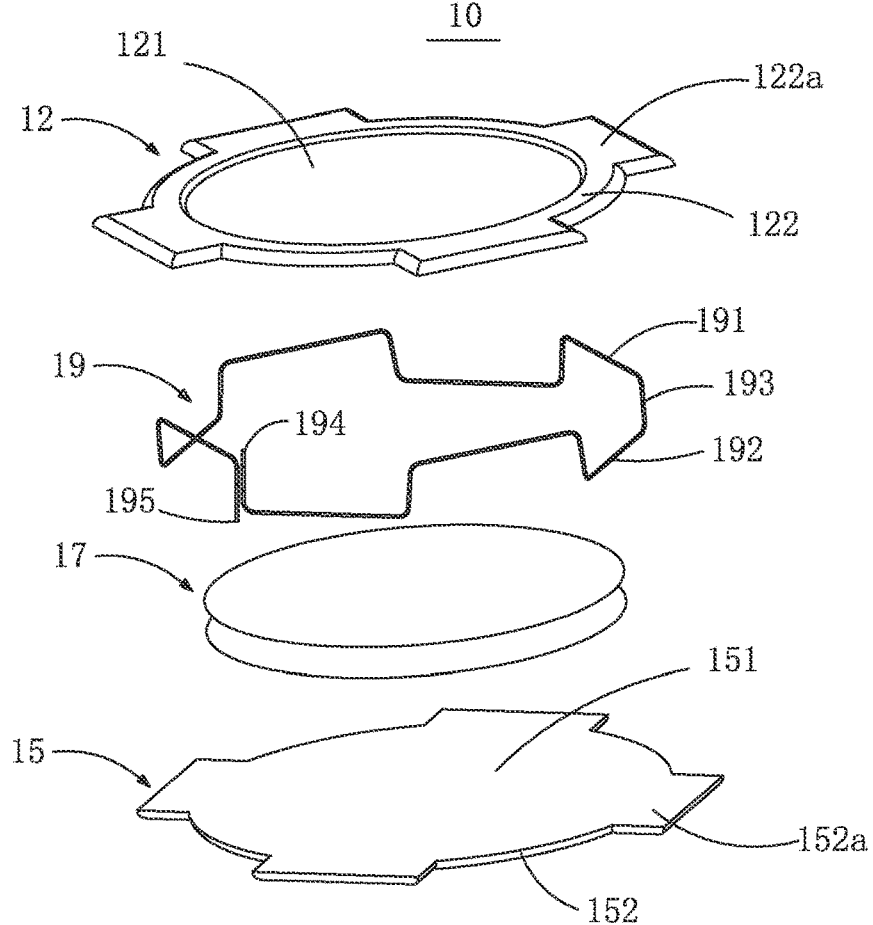
FIG. 2 is an isometric and exploded view of the apparatus in FIG. 1.

Referring to FIG. 1, an auto-focus apparatus 10 for a camera of a first exemplary embodiment of the present invention is illustrated. The auto-focus apparatus 10 includes a first lens 12, a second lens 15, a transparent elastic spacer 17 sandwiched between the first and second lenses 12, 15, and an SMA (shape memory alloys) wire 19 fixed to the first and second lenses 12, 15. The transparent elastic spacer 17 is sandwiched by the first lens 12 and the second lens 15 and is formed by optical jelly or other gel-like materials, like polyorganosiloxane. The SMA wire 19 includes one end connecting to the first lens 12, and another end connecting to the second lens 15. When an electrical signal is input to the SMA wire 19, compared with a state when no electrical signal is input, temperature changes, and a length of the SMA wire 19 also changes accordingly. When the length of the SMA wire 19 changes, a distance between the first lens 12 and the second lens 15 is changed thereby. For example, a length of the SMA wire 19 in a conductive state is shorter than a length of the SMA wire 19 in a non-conductive state. The electrical signal input to the SMA wire 19 may be a PWM (Pulse Width Modulation) signal. When the distance between the first and second lenses 12, 15 is changed, the focal length or the focal point is changed accordingly. According to the instruction from the camera, the distance between the first and second lenses is changed accurately and the focal point is adjusted onto the image sensor. More specifically, as shown in FIGS. 1-6, the SMA wire 19 shrinks in a conductive state, thus deforming the first lens 12 and the second lens 15 squeeze the transparent elastic spacer 17. The first lens 12 bends towards the second lens 15 and the second lens 15 also bends towards the first lens 12. In this way, the distance between the first lens 12 and the second lens 15 is changed, thus deforming the transparent elastic spacer 17. It can be understood that the deformation of the transparent elastic spacer 17 can adjust the focus position of the auto-focus apparatus 10, thus achieving the auto focus function. Then, the SMA wire 19 restores in a non-conductive state. In the present invention, the deformation of the first lens 12, the second lens 15 and the transparent elastic spacer 17 collaborate to make an attribution to the auto-focus function of the auto-focus apparatus 10.

Figure 3:
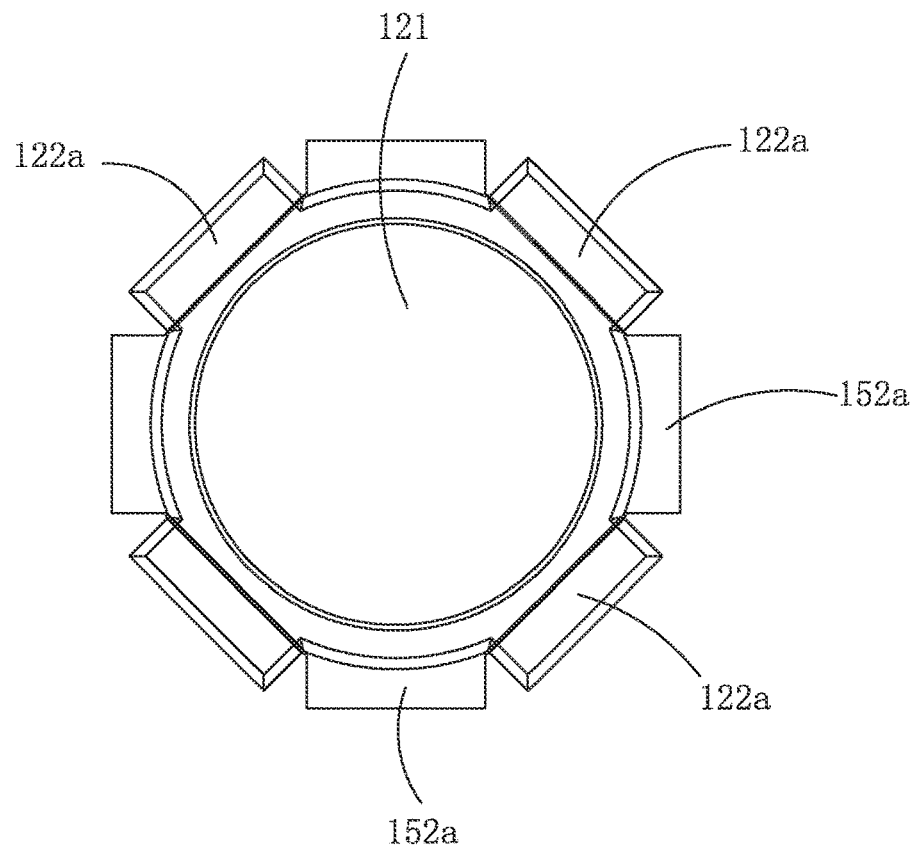
FIG. 3 is a top view of the apparatus in FIG. 1.
Figure 4:
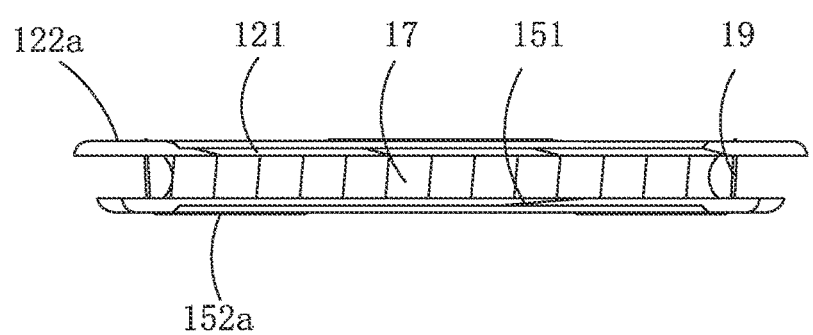
FIG. 4 is a cross-sectional view of the apparatus taken along line A-A in FIG. 1.
Figure 5:
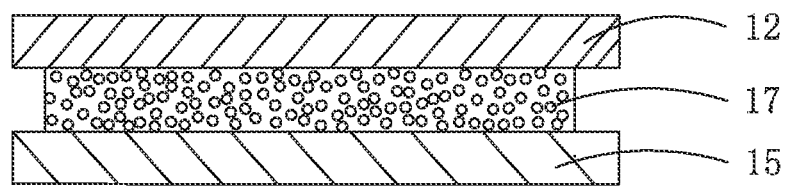
FIG. 5 is an illustration of the apparatus in FIG. 1 when no electrical signal is input to an SMA wire in the apparatus.
Figure 6:
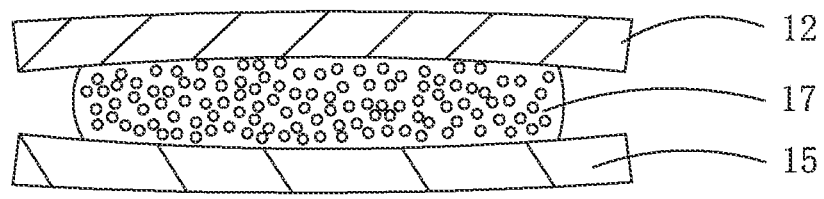
FIG. 6 is an illustration of the apparatus in FIG. 1 when an electrical signal is input to the SMA wire in the apparatus.

Referring to FIGS. 1-4. The apparatus 10 in FIG. 1 is an optimized embodiment of the present invention. In the optimization, the first lens 12 includes a first lens unit 121, and a first lens plate 122 surrounding and fixing the first lens unit 121. The first lens plate 122 further includes a plurality of flanges 122a extending from a periphery of the first lens plate 122. The second lens 15 includes a second lens unit 151 and a second lens plate 152 surrounding and fixing the second lens unit 151. Further, the second lens plate 152 includes a plurality of second flanges 152a extending from a periphery of the second lens plate 152. The transparent elastic spacer 17 is tightly sandwiched between the first lens 12 and the second lens 15. Optionally, the spacer 17 covers completely the first and second lens units 121, 151. Referring further to FIG. 3, the SMA wire 19 includes a first fixing part 191 connecting with the first lens 12, a second fixing part 192 connecting with the second lens 15, and a connecting part 193 connecting between the first fixing part 191 and the second fixing part 192. As an optimization, the first fixing part 191 attaches to the first flanges 122a, and the second fixing part 192 attaches to the second flanges 152a. Further, the first lens 12 and the second lens 15 are such configured that the first flanges 122a are malposed with the second flanges 152a, meaning that viewing along an optical axis 60 (as shown in FIG. 4) of the auto-focus apparatus 10, each of the first flanges 122a at least partially overlaps a vacancy formed by two adjacent second flanges 152a, and each of the second flanges 152a at least partially overlaps a vacancy formed by two adjacent first flanges 122a. Such that, the connecting part 193 extending between the first fixing part 191 and the second fixing part 192 along a direction parallel to the optical axis 60. In this embodiment, the SMA wire 19 is in a string shape, including a first end 194 and a second end 195 electrically connected with external power supply.

Figure 7:
FIG. 7 is an illustration of the apparatus in FIG. 1 used in a camera in accordance with an exemplary embodiment of the present invention.
Figure 7:
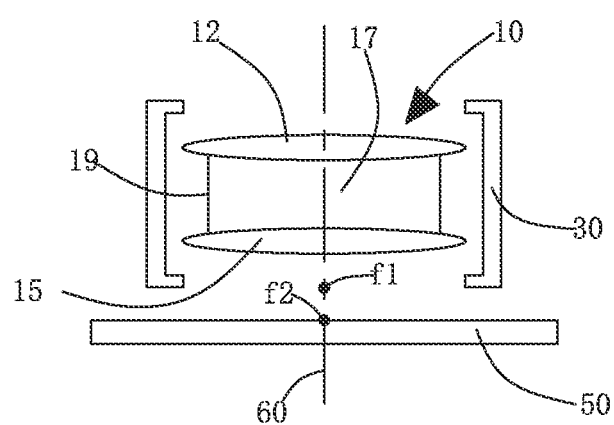
Figure 8:
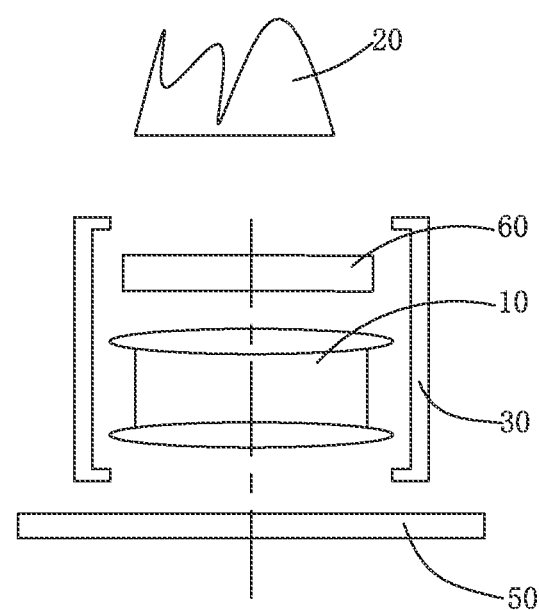
FIG. 8 is an illustration of apparatus in FIG. 1 used in a camera in accordance with another exemplary embodiment of the present invention.

Referring to FIG. 7, when the apparatus 10 used in a camera to capture a photo if a target object 20, the SMA wire 19 will pull the first lens 12 toward the second lens 15 relatively for changing a distance along the optical axis 60 between the first and second lenses 12, 15, due to an instruction from the camera. By virtue of the change of distance and the deformation of the transparent elastic spacer 17, a focal point f1 which brings a blurry photo will be moved onto an image sensor 50 which brings a sharp image. Sure, the distance will also be increased by the elastic form of the transparent elastic spacer 17. For securing the apparatus 10, the camera further includes a holder for accommodating the apparatus 10 therein. Please refer to FIG. 8, in other embodiments, the camera further includes at least one lenses 60 spaced away from the apparatus 10 along the optical axis. The lens 60 is located on an object side of the apparatus 10.

Compared with the related art, no complicated structure like coils and magnets is needed. By the configuration of the present invention, the cooperation between the SMA wire and the transparent elastic spacer serves as a driver to adjust a distance between two lenses of a camera further and deform the transparent elastic spacer to move the focal point of the camera onto the image sensor for performing auto-focus function, even for performing zoom function. It could be understood that when the apparatus includes more than two lenses, the configuration of this invention will also work so as to configure the SMA wire and the transparent elastic spacer between selected lenses for adjusting the distance between the selected lenses. The key point of the invention is to adjust a distance between two lenses via the cooperation of an SMA wire and a transparent elastic spacer located between the selected lenses, without using additional voice coils or magnets. Thus, the driving system of a camera to perform auto-focus or zoom is simplified and the cost is accordingly decreased.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A auto-focus apparatus for a camera, including:
    a first lens;
    a second lens spaced from the first lens;
    a transparent elastic spacer sandwiched between the first lens and the second lens;
    a shape memory alloy wire having a first fixing part connecting with the first lens, a second fixing part connecting with the second lens, and a connecting part connecting the first fixing part to the second fixing part; wherein
    the shape memory alloy wire is configured to change a distance between the first lens and the second lens to deform the transparent elastic spacer for performing auto-focus function.

2. The auto-focus apparatus as described in claim 1, wherein the first lens includes a first lens unit, a first lens plate surrounding and supporting the first lens unit, a plurality of first flanges extending from a periphery of the first lens plate, and a plurality of first vacancies formed between adjacent two first flanges; the first fixing part attaches to the first flanges.

3. The auto-focus apparatus as described in claim 2, wherein the first fixing part attaches to a surface of the first flange away from the second lens.

4. The auto-focus apparatus as described in claim 3, wherein the second lens includes a second lens unit, a second lens plate surrounding and supporting the second lens unit, a plurality of second flanges extending from a periphery of the second lens plate, and a plurality of second vacancies formed between adjacent two second flanges; the second fixing part attaches to the second flanges.

5. The auto-focus apparatus as described in claim 4, wherein the second fixing part attaches to a surface of the second flange away from the first lens.

6. The auto-focus apparatus as described in claim 4, wherein viewing along an optical axis of the auto-focus apparatus, each of the first flanges at least partially overlaps the second vacancy formed by two adjacent second flanges, and each of the second flanges at least partially overlaps the first vacancy formed by two adjacent first flanges.

7. A camera, including:
    a holder;
    an auto-focus apparatus accommodated by the holder; wherein
    the auto-focus apparatus includes a plurality of lenses, a transparent elastic spacer sandwiched by two selected lenses, a shape memory alloy wire having a first fixing part connecting with an edge of one of the selected lenses and a second fixing part connecting with an edge of the other of the selected lenses for changing a distance between the two selected lenses to deform the transparent elastic spacer for performing auto-focus function.

8. The camera as described in claim 7, wherein the shape memory alloy wire further includes a connecting part connecting the first fixing part to the second fixing part along the optical axis.

9. The camera as described in claim 8, wherein one of the selected lenses includes a first lens unit and a first lens plate supporting the first lens unit, and the first lens plate includes a plurality of first flanges for attaching with the first fixing part of the shape memory alloy wire.

10. The camera as described in claim 9, wherein the other of the selected lenses includes a second lens unit and a second lens plate supporting the second lens unit, and the second lens plate includes a plurality of second flanges for attaching with the second fixing part of the shape memory alloy wire.

11. The camera as described in claim 10, wherein the first flanges form a plurality of first vacancies, and the second flanges form a plurality of second vacancies malposed with the first vacancies viewing along the optical axis.

12. A lens for a camera, including:
    a first lens unit with a first edge having a first upper surface and a first lower surface opposite to the first upper surface;
    a second lens unit with a second edge having a second upper surface facing the first lower surface and a second lower surface away from the first lower surface;

an elastic spacer sandwiched between the first lower surface of the first lens unit and the second upper surface of the second lens unit; and a shape memory alloy wire determining a distance between the first and second lens units extending from the first upper surface to the second lower surface; wherein the elastic spacer is configured to deform for performing auto-focus function when the distance between the first and second lens change.

13. The lens for a camera as described in claim 12, wherein the first edge of the first lens unit forms a plurality of first flanges with the first upper surface, the second edge of the second lens unit forms a plurality of second flanges with the second lower surface; and the shape memory alloy wire extends from the first upper surface to the second lower surface bendingly.

14. The lens for a camera as described in claim 13, wherein the first flanges are malposed with the second flanges viewing along the optical axis of the lens.

* * * * *